Oct. 18, 1955  O. J. LEONE  2,720,783
BRIDGE TYPE ELECTRICAL INTEGRATOR
Filed Feb. 6, 1947  5 Sheets-Sheet 1

Inventor
Otto J. Leone
By:
Christy, Parmelee & Strickland
Attorneys

Inventor
Otto J. Leone

Oct. 18, 1955                O. J. LEONE                2,720,783
                    BRIDGE TYPE ELECTRICAL INTEGRATOR
Filed Feb. 6, 1947                                5 Sheets-Sheet 4

Inventor
Otto J. Leone
By:
Christy, Parmelee & Strickland
Attorneys

Oct. 18, 1955     O. J. LEONE     2,720,783
BRIDGE TYPE ELECTRICAL INTEGRATOR
Filed Feb. 6, 1947

Inventor
Otto J. Leone
By Christy, Parmelee & Strickland
Attorneys

United States Patent Office 2,720,783
Patented Oct. 18, 1955

2,720,783
BRIDGE TYPE ELECTRICAL INTEGRATOR

Otto J. Leone, West Newton, Pa.

Application February 6, 1947, Serial No. 726,887

4 Claims. (Cl. 73—206)

This invention relates to an electrical integrator for totalizing measured quantities, such as rates of flow of fluids, and is particularly advantageous where fast and continuous integration must be obtained, particularly where very little power is available from the measuring element.

Several common types of continuous electrical integrators employ a potentiometer slide wire or rheostat, which in turn operates an integrating motor. However, in many situations, there is insufficient power available from the measuring system to operate such potentiometer devices and for this reason, intermittent integrators are used instead. However, for many applications, intermittent integrators are too slow in operation, such as, for example, in the metering of dry oxygen on flame cutting applications where a gas torch is used to deseam or scarf steel billets. In such application, a fast and continuous integrator is desirable, particularly since the period of time between flow-on and flow-off is perhaps only 15 or 20 seconds, the rates of the flow during this period fluctuating rapidly and widely.

Attempts have been made in the past to use watt hour meters with resistance elements and some form of inductance in the circuit to give the proper phase relations between current and voltage. However, an outstanding disadvantage of this method is that the resistance element is placed in the meter body and must be contacted or wiped by the mercury in the meter, and in order to prevent the integrator disc from rotating at the zero flow position, some of the resistance contacts must be omitted, thereby giving a dead spot. Furthermore, because of the stepped spacings between contact points, there is no continuous and smooth metering throughout the flow range but, instead, there are a series of steps in the flow curve.

An object of this invention is to overcome the above mentioned disadvantages of integrators of the intermittent type, and to provide a novel, fast and continuous integrator embodying various alternating current bridge circuits in combination with a watt hour integrating meter or two-phase motor, so as to eliminate the aforementioned stepped curve relation and to effect a continuous integration responsive to the positions of an indicating element, such as a flow indicating pen, a float in a variable orifice meter or a differential pressure manometer or the like.

The essential principle involved in the present invention is that in an alternating current bridge arrangement with its legs or branch circuits made up of inductances, capacitances, resistances or combinations of these elements, if the impedance of the bridge becomes unbalanced, there will be a flow of energy or current from one side of the bridge to the other, however, if the impedance legs are properly balanced with respect to impedance values, the flow of current will cease. Furthermore, when this unbalance exists, a phase displacement between current and voltage will exist, the amount of this displacement being a function of the relative impedance values of the branch legs.

A further object of the present invention is to provide an electrical bridge type integrator that is substantially devoid of friction and errors arising therefrom and that totalizes not only positive but negative movements of an indicating element so as to register the net change in a given direction by subtracting the negative quantities from the positive quantities in the totalizing operation.

Other objects and advantages of the present invention will become apparent from a study of the following specification taken with the accompanying drawings wherein.

Figure 1:
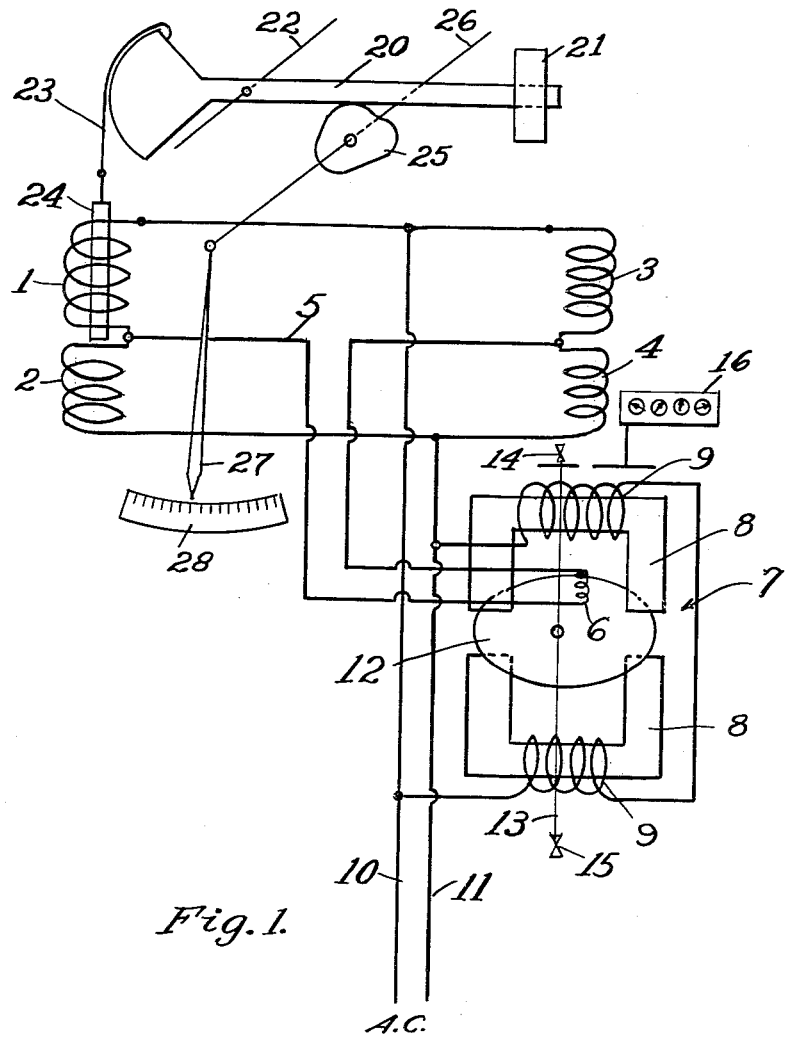
Fig. 1 is a schematic wiring diagram of an A. C. bridge type electrical integrator including a watt hour integrating meter (or two-phase motor) and embodying the principles of the present invention.

Referring more particularly to Fig. 1, numerals 1, 2, 3 and 4 indicate four inductance coils or reactances forming four legs of an alternating current bridge network. The neutral wire or center tap 5 is connected in series with a current coil 6 of an electrical integrator 7 in the form of a watt hour meter of the induction type or which may be of a two-phase motor. The watt hour meter type integrator motor has stationary magnetic cores 8 on which are wound voltage coils 9, which coils are connected across the supply conductors 10 and 11 energized by a suitable alternating current source of potential, such as a 60 cycle, 110 A. C. source. The watt meter type integrator has a rotor 12 mounted on a shaft, indicated schematically by numeral 13, which is journaled in bearings 14 and 15 and geared to a counter 16 of any well-known type, such as a cyclometer counter or the type of counter used for measuring total kilowatt hours supplied to homes and the like.

A beam or lever 20 having a counterweight 21 and pivoted at fulcrum 22 has suspended at one end, such as by a cord 23, an armature core 24 which is adapted to be moved axially of reactance coils 1 and 2, the neutral position, if desired, being such that the armature projects through equal portions of both coils. A cam 25 upon which beams 20 rests, is secured to a meter shaft 26 at the end of which shaft is rigidly secured a pointer 27 which moves along a scale 28. The purpose of the cam 25 is to compensate for the non-linear relationship which exists between the quantity being measured such as, for example, flow rate, and the linear movement of armature 24. By properly shaping the cam 25, compensation is made for the nonlinear relationship existing between rotation of meter shaft 26, which is responsive to the position of the float or other position indicating element, and the linear movement of armature core 24.

The A. C. bridge will be in balance and no current will flow through the mid-tap 5 if the following relationship exists among the impedances of the various coils where $Z_1$ represents the impedance of coil 1, etc.: $Z_1 \div Z_2 = Z_3 \div Z_4$. When balance exists there will also be a ratio of phase displacements between voltage and current in the respective legs of the bridge where $PD_1$ is the phase displacement in coil 1, etc.:

$$PD_1 \div PD_2 = PD_3 \div PD_4$$

However, if the armature 24 is moved from its zero or balanced position between coils 1 and 2 so as to cause unbalance of the bridge, the impedance, as well as the phase displacement ratios, will become unbalanced. When these impedance and phase relationships become unbalanced, a current will flow in the neutral wire which will be out of phase with the supply voltage. By virtue of the connection of one of the coils, such as the current coil of the watt hour meter integrator (or two-phase motor) 6 in the neutral wire of the bridge circuit, and the connection of the other integrator coil, such as the voltage coil, in parallel with the power supply voltage, there will be produced in the integrator by the current and voltage coils, two alternating current fluxes which are not in time phase with each other, except perhaps when the bridge is balanced as at zero flow in the fluid metering device. By applying these fluxes to the integrator armature disc 12 in different places, or by displacing the sets of coils in space in the case of a two-phase motor, a torque will be produced which will be proportional to the product of the two fluxes and the sine function of the phase displacement angle between them. By proper design of reactance values so that the flux caused by the voltage coil will always lag behind the voltage by 90°, the torque may also be made equal to the power supplied, as is done by "lagging" conventional electric watt hour integrators which measure true power, although it should be noted that this condition is not necessary when using this integrator to totalize fluid flow. The torque induced into the meter disc or motor shaft will be proportional to the linear displacement or linear distance traveled by armature 24 from a balanced or zero condition, such as is had when armature 24 is positioned with half of its length in coil 1 and the other in coil 2 (or is totally outside of both coils). In other words, assuming meter shaft 26 is connected to a flow meter float, the speed of rotation of disk 12, that is, of the integrator motor, would be proportional to the linear displacement of armature 24 from its neutral position and to the rate of flow. Likewise, the total number of revolutions of the integrator motor over a given period, as indicated by counter 16, would likewise be proportional to the flow rate. The shape of cam 25, of course, would compensate for whatever nonlinearities exist between the flow rate and the linear displacement of armature 24. This cam can also be used to convert or compensate for any unbalance forces induced into the core 24 by the solenoid magnetic flux or to compensate for inherent manufacturing inaccuracies in the winding of the coils.

In the case of a flow meter using a fixed orifice in a pipe, it is necessary to extract the square root in the flow formula Q (the rate or quantity) $= C \times A \times \sqrt{2gh}$ where C is an orifice coefficient, A is the orifice or pipe area, g is the gravity constant 32.17 and h is the measured pressure drop across the primary restriction or orifice. Stated differently, in order to use the watt hour meter integrator and to secure the proper relationship between integrator revolutions per unit of time and quantity rate of flow, a square root cam 25 must be used. If the integrator in Fig. 1 is used with a fixed orifice meter and the pointer 27 is attached to shaft 26, the divisions on scale 28 will be square root or increasing. However, regardless of whether the pointer scale is rectified or not by using a cam the square root of the pressure differential across the fixed orifice will have to be rectified, either by using the cam, or as is done in some meters, by using a "square root displacer" inside the meter manometer body.

Figure 4:
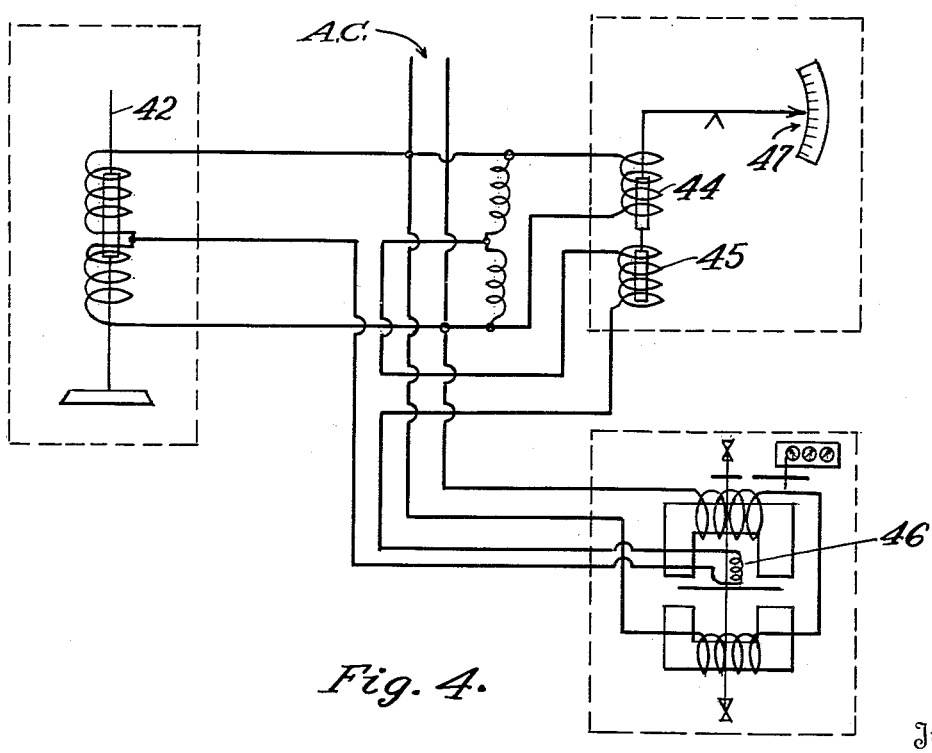
Fig. 4 shows a further modification similiar in many respects to the one shown in Fig. 3, except that a single A. C. bridge is used, instead of a double bridge, and wherein the indicator coil arrangement is somewhat different.

If the circuit in Fig. 1 is used with a variable orifice meter as shown in Fig. 4, no square root extraction is required.

As indicated above, the integrator may be either a watt hour inductance meter, or may be, instead, a two-phase induction motor, such as one having two sets of coils set 90° out of phase and connected to a cyclometer counter, such as 16. The voltage coils 9 are continuously energized since they are connected directly across the line terminals 10 and 11 and are of constant potential, whereas the current coil 6 will have a variable field strength which will depend upon the current flow in the neutral circuit 5. Any flow of current from circuit 5 will then affect the phase relationship of the integrator motor so as to cause the integrator disk or motor armature, as the case may, to revolve at a rate which would be proportional to the current flow.

The integrator when not turning does not necessarily represent no current flow in the center wire, but merely indicates that the current flux and voltage flux on the integrator coils are in phase and give no resultant torque on the disc.

Figure 2:
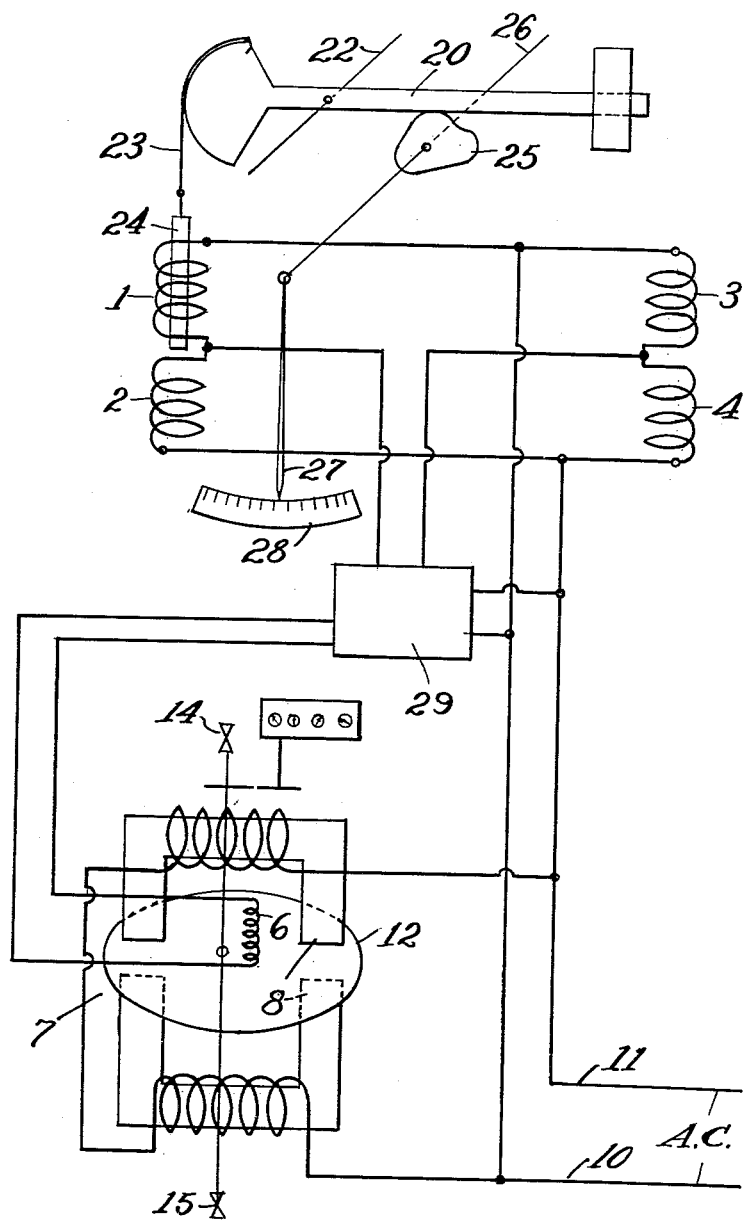
Fig. 2 is a modification of the wiring diagram shown in Fig. 1 wherein the essential difference is the addition of an amplifier between the bridge and watt hour integrating meter.

Fig. 2 shows a circuit which is almost identical to that shown in Fig. 1, hence the parts are represented by the same reference numerals, with the exception that an amplifier of any well known type, indicated schematically by a block diagram 29, is provided so as to amplify the current flow in the neutral circuit. That is to say, the terminals from the neutral wire 5 are connected to the input of the amplifier, while the current coil of the integrator is connected to the output of the amplifier. The amplifier is energized by the same A. C. source that energizes the bridge. It will thus be seen by the arrangement shown in Fig. 2 that it is necessary merely to use very small solenoid coils so that the armature can be operated from a low torque element capable of exerting only a small force. An amplifier can also be used where the value of ampere turns for the solenoid coils is designed to be of low (NI) value, so that the force required to displace the solenoid core 24 can be kept as small as possible or conversely the reactive force on the solenoid will be so small that compensation will not be required.

Figure 3:
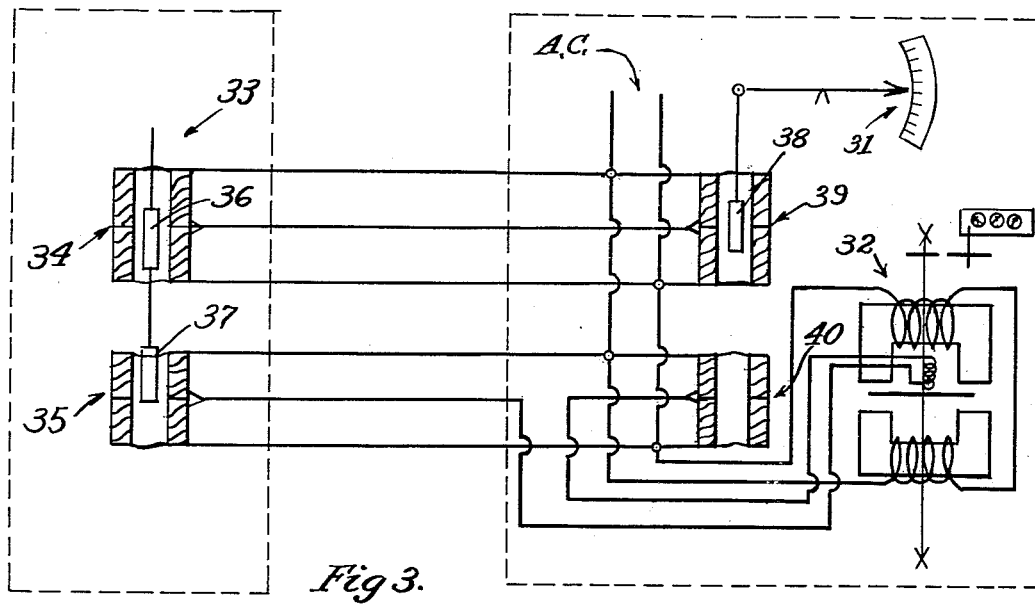
Fig. 3 shows a further modification wherein two A. C. bridge circuits are used for measuring flow rates of a fluid and wherein a flow rate meter or indicator is employed in addition to the flow integrator meter.

Fig. 3 shows a modification of the circuit which embodies a double inductance bridge arrangement to operate both an indicator 31 (or recorder-receiver) and a continuous integrator 32 from a flow meter transmitter 33. The coil groups 34 and 35 act as transmitter coils and each form two of the coils of a four coil bridge arrangement. The coils of each group may be connected so as to be of opposite magnetic and electric polarities, and the relative positions of the solenoid cores 36 and 37 as placed on their common shaft, which is preferably of a material of low magnetic permeability, that the differential arrangement will cancel out most of the force reactions on the rod due to the magnetic fluxes of coils 34 and 35. As explained before this compensating refinement may be omitted where the meter actuating force is large enough to not be affected appreciably. Armatures 36 and 37 are connected to the same stem attached to the meter element and move axially of coil groups 34 and 35, respectively. The indicating or recording meter 31 is actuated by an armature 38 located in axial relationship to the other two sets of coils 39 and 40 of the bridge. It will be understood, of course, that the watt hour integrating meter 32 or the indicator (or recorder) 31 may be used either together, as shown, or separately, if so desired.

Fig. 4 also shows an arrangement for using an A. C. bridge as a flow meter to indicate or record the rate of flow while simultaneously using a watt hour meter to continuously integrate the flow. The arrangement differs from that shown in Fig. 3 principally in the provision of a single A. C. bridge, instead of a double bridge. As shown, the transmitter float 42 may be that of a variable orifice meter. Coil 44 in the recorder or indicating circuit is a voltage coil connected in parallel with the voltage coil of the watt hour meter. Coil 45 is a current coil whose field strength is a function of the center tap current flow in the bridge and is in series with the integrator current coil 46. An indicator 47 is operated by a double armature mounted on a single stem and passing through coils 44 and 45. By adding other coils in parallel circuit with coil 44 and other coils in series circuit with coil 45, additional indicators or recorders may be operated by the same transmitter.

Figure 5:
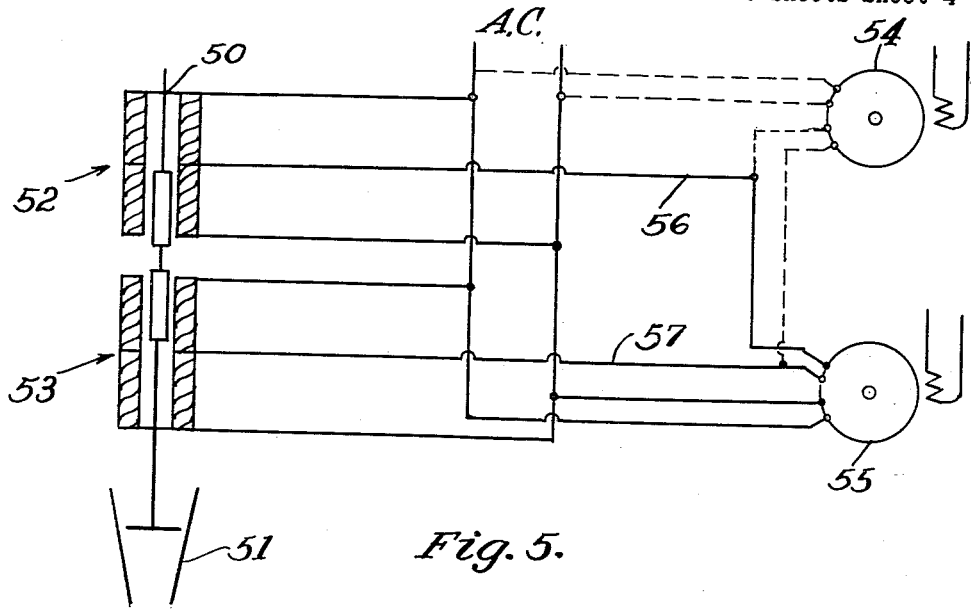
Fig. 5 shows a further modification of a double A. C. bridge type electrical integrator wherein the integrator meter is in the form of a two-phase motor and wherein the metering shaft forms part of a Rotameter type variable orifice meter wherein the pressure drop across the meter float is essentially constant so that the float position determines the orifice area exposed, hence the rate of flow.

Fig. 5 shows an alternate arrangement of an A. C. bridge using all four reactance coils so as to obtain a compensating effect on the metering armature so that one set of coils will cancel out any resultant force on the metering shaft or float that results from the inductance coil magnetic forces. In this manner, the float or meter shaft position would be more accurate, particularly if the actuating forces are feeble. Although a Rotameter float 50 is shown, the same principle can be adapted to manometer type meter shafts. By making the metering tube 51 frustoconical or substantially so, the fluid flow therethrough will provide a straight line relationship between fluid flow rate and the orifice area represented by the float position, hence eliminating the necessity for a compensating cam, such as 25 of Fig. 1.

The use of a variable orifice meter, as shown in Fig. 5, eliminates the necessity of a square root extractor described hereinbefore. Although the same flow formula $Q=CA\sqrt{2gh}$ as indicated above applies, the variable orifice flow meter operates on the principle that the differential head "$h$" is constant but the meter actually measures the changes in orifice area A which is linear with respect to Q. If the float is used to record rate of flow of a Rotameter type of variable orifice meter, a tapered tube, as shown, is employed so that the pressure drop across the meter float is essentially constant and so that the float position determines the orifice area exposed and therefore the rate of flow.

A double armature of magnetic material mounted on a common float rod 50, preferably of low permeability material, moves in a pressure-tight tube which is part of the Rotameter or variable orifice meter. This tube is also made of material that is low in magnetic permeability. Two reactance coil pairs 52 and 53 of the bridge are so placed that they surround the pressure-tight tube permitting axial movement of the magnetic armature cores in the coils. The coils 52 and 53 are connected to have their instantaneous magnetic and electric polarities in opposition and the relative positions of the two magnetic armatures can be arranged with respect to the solenoid coil magnetic fluxes that any resultant force on the float due to the coil fluxes will annul or cancel each other. The recorder or indicator 54 may be a two-phase motor. Likewise, the integrator meter 55 may be in the form of a two-phase motor, however, it being understood that other types of devices having the same function may be substituted, such as a watt meter for 54 and watt hour meter for 55. Conductors 56 and 57 are connected to the current coils of the meters, if of the watt meter type. Indicator 54 may be omitted, if desired, with its conductors shown in dotted lines. When a two-phase motor is utilized as an integrator element 55, the armature of the motor will be subject to a motor field winding connected across the power source and a motor field winding connected across center taps on each side of the bridge so that rotation of the armature will be responsive to changes in flux generated by current flow through that center tap winding, the armature in turn acting to operate an integration record of some sort. Similarly, if a two-phase motor is used to operate an indicator pointer or pen arm from the position 54, it may utilize, for example, a restoring spring or counterweight to return the armature to indexing position when the operative torque thereon ceases.

Figure 6:
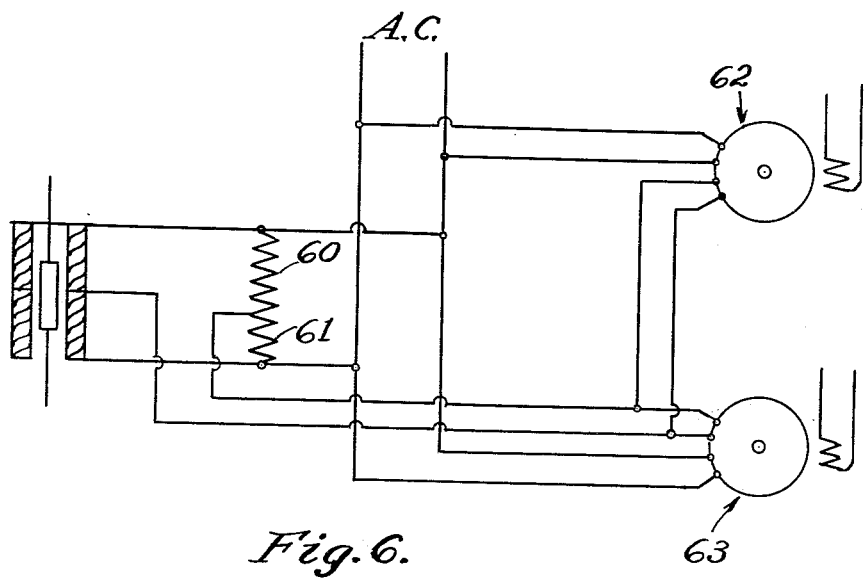
Fig. 6 is a modification similar in many respects to Figs. 4 and 5, but wherein resistances are substituted for inductances in two arms of the A. C. bridge.

Fig. 6 shows an arrangement very similar to that of Fig. 1 but wherein resistances 60 and 61 are substituted for the two reactance arms 3 and 4 of Fig. 1 of the A. C. bridge. Also, two-phase motors 62 and 63 may be used for the indicator (or recorder) and the integrating meter, respectively. Of course, other types of indicators may be used instead.

Figures 7, 8:
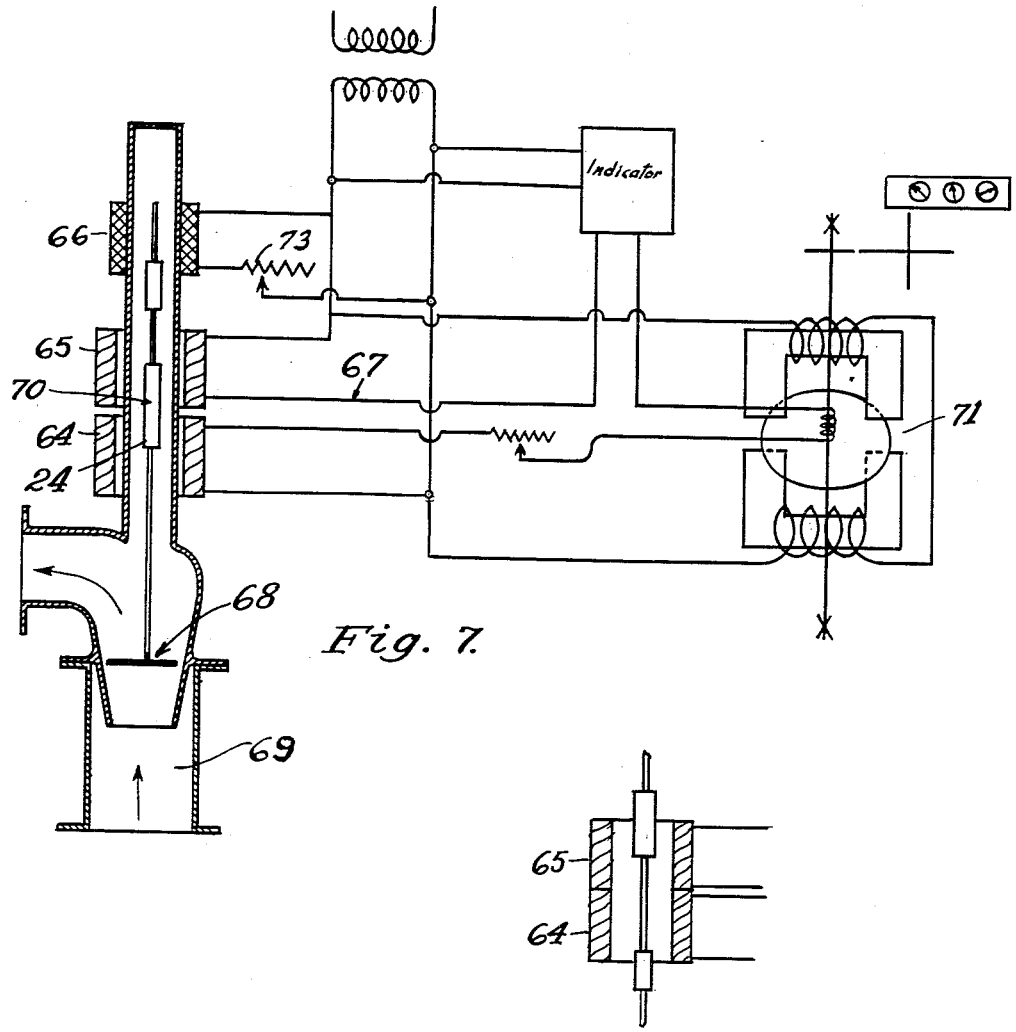
Fig. 7 is a further modification of the bridge type integrator including two split reactance coils.
Fig. 8 shows a modified form of coil for compensation.

Fig. 7 shows another modified bridge arrangement using two split reactance coils 64 and 65 so connected to the integrator circuit that the current coil of the totalizer 71 (or one field of a two-phase motor) will be in series between two adjacent inner ends of the coils; the relative reactance in the two solenoid coils as caused by the displacement of the magnetic solenoid armature will affect the phase relation between the current and voltage fluxes in the integrator disc and thus determine the torque or disc speed developed. An alternate method of compensating the solenoid armature shaft 50 for any forces due to the solenoid magnetic field fluxes of solenoids 65 and 64 is also illustrated, using only one reactance coil energized from the common power source, and in which the ampere turn value can be adjusted by means of a resistance 73 as required for proper compensation. By this method, coil 66 takes the place of the split coil 52 in Fig. 5. While there are metering devices which have sufficient power to move the solenoid armature so as not to be affected by any forces caused by structural fluxes in the solenoid armature, the compensation may be desirable when the meter actuating forces are feeble.

More specifically, Fig. 7 shows a modified bridge arrangement which uses a split reactance coil with the tap wires coming out of the adjutting ends of the coils in series with the current coil of the integrating watt hour meter. The potential coils of the integrator motor are in parallel with the power supply. By suitable choice of reactance values, there will be one position of the magnetic core in the solenoid for which the meter shaft or disc will not turn, and which position will correspond to the zero float or no-float position. Displacement of the armature core from the zero position toward the maximum flow position will cause a change in the relative reactance values of the split solenoids and will affect the phase relations of the voltage and current coil fluxes in the integrator motor so as to cause a disc rotation that is proportional to the rate of flow.

Referring to Fig. 7, two variable reactance solenoids, 64 and 65, are connected in series with either the integrator or two-phase motor coils, with the meter coil placed between the common series wire connecting the solenoids. When the rate of flow in flow meter 69 causes the meter float to move, magnetic core 70 moving in one or both coils 64 or 65, changes the phase relation between current and voltage power supply to integrator 71 so that the current and voltage coil fluxes in the integrator motor will have both phase and space displacement and cause the meter shaft to rotate.

For purposes of showing an alternate method of compensating the meter float armature against reactive forces due to the split coil fluxes, there may be provided another compensator using a single coil 66 connected in parallel to the power supply. A rheostat 73 in the circuit permits adjusting the ampere turns (NI) value as required to give best compensation, which is also determined by the relative position of the solenoid cores in their respective solenoids. There are other ways for example, as shown in Fig. 8, of accomplishing this compensation as by using the split coil only and arranging two cores within the split coils to form a differential solenoid arrangement making the compensating coil smaller than the metering core, but large enough so that the magnetic flux pulling on it at the end of one of the coils will compensate for the forces due to flux reaction.

Fig. 8 shows such other way for compensation where the coil 66 can be eliminated and two armatures can be so placed within coils 64 and 65 that compensation will be accomplished.

Compensation has been stressed because it makes the difference between a good meter and a bad meter where the metering float forces are feeble. Of course, as with the other bridge arrangements, by using low NI values and an amplifier, these compensating features can be dispensed with.

Thus it will be seen that I have provided an efficient and reliable integrator and indicating (or recording) system embodying an A. C. reactance bridge that has the outstanding advantage that it will integrate continuously with very minute power requirements and without the hereinbefore mentioned stepped curved relation all the way from the zero position throughout the flow range. A further advantage of the inductance coil type bridge is that since the coil is placed outside the meter body, and the magnetic float only would be inside the meter body, there is no necessity of a sealing fluid to separate the contacts from the metering fluid or to prevent arcing, as in the case where the resistance element is used. Furthermore, my A. C. reactance bridge type integrator eliminates friction such as is otherwise caused by slide wire rheostats, stuffing boxes and the like, moreover, I have provided an integrator which is quickly and accurately responsive to sudden changes of flow rate or other variable quantities.

While I have illustrated and described certain specific embodiments of my invention, it will be understood that this is by way of illustration only and that various changes and modifications may be made within the contemplation of my invention and within the scope of the following claims.

I claim:

1. In combination, a member having movement proportional to a flow of fluid in a fluid system, two pairs of series connected impedance bridge legs connected across an alternating current power source, said pairs of legs being in impedance balance at a selected flow condition in said fluid system, means responsive to movements of said member to vary the impedance in at least one of said legs in at least one of said pairs in proportion to variations in said flow of fluid, a circuit extending between intermediate taps between legs in each of said pairs of legs, a current coil in series connection in said circuit, a voltage coil connected across said alternating current power source, an inductive rotor subject to flux generated by said voltage coil and responsive to flux generated by said current coil, and integrator means responsive to said rotor to indicate aggregate flow in said fluid system.

2. In combination, a member having movement proportional to a flow of fluid in a fluid system, two pairs of series connected impedance bridge legs connected across an alternating current power source, at least one pair of legs being inductive, said pairs of legs being in impedance balance at a zero flow condition in said fluid system, a magnetic armature responsive to movement of said member cooperating with said inductive pair of legs and varying the impedance thereof in proportion to variations in said flow of fluid, said armature having a zero flow position relative to said inductive pair of legs at which said legs are in impedance balance, a center tap between the legs in each of said pairs of legs, a current coil in series with said center taps, a voltage coil connected across said alternating current power source, an inductive rotor subject to flux generated by said voltage coil and responsive to flux generated by said current coil, and an integrator driven by said rotor, whereby said rotor is moved proportionately to flow in said fluid system and its direction of movement is controlled by the position of said armature to one side or the other of its zero flow position to totalize flows in said fluid system regardless of direction of flow.

3. In combination, a member having movement proportional to a flow of fluid in a fluid system, a bridge having two pairs of series connected impedance legs connected across an alternating power source, the legs in each of said pairs being inductance coils, said pairs of legs being in impedance balance at a selected neutral condition in said fluid system, an armature core moving in accordance with movements of said member and axially of said inductance coils in at least one of said pairs of legs for varying the impedance ratio of said bridge in proportion to variations in said flow of fluid, said armature core having a neutral position relative to said inductance coils at which said bridge is in impedance ratio balance, a neutral tap between the legs in each of said pairs of legs, a current coil in series with said neutral taps, at least one voltage coil connected across said alternating current power source, an inductive rotor subject to flux generated by said voltage coil and responsive to said flux generated by said current coil, and integrator means responsive to said rotor to aggregate the quantity of flow in said fluid system.

4. In combination, a member having movement proportional to a flow of fluid in a fluid system, a bridge having two pairs of series connected impedance legs connected across an alternating current power source, said pairs of legs being in impedance balance at a selected flow condition in said fluid system, armature means responsive to movements of said member to vary the impedance ratio in said bridge in proportion to variations in said flow of fluid, a circuit extending between intermediate taps between the legs in each of said pairs of legs, a current coil in series connection in said circuit, at least one voltage coil connected across said alternating current power source, an inductive rotor subject to flux generated by said voltage coil and responsive to flux generated by said current coil, an integrator driven by said rotor to aggregate flow in said fluid system, and an indicator responsive to current flow in said circuit to indicate rate of fluid flow.

References Cited in the file of this patent

UNITED STATES PATENTS

| Number | Name | Date |
| --- | --- | --- |
| 1,607,537 | Hodgson | Nov. 16, 1926 |
| 1,668,457 | Kath | May 1, 1928 |
| 1,768,553 | Freeman | July 1, 1930 |
| 2,025,774 | Rennick et al. | Dec. 31, 1935 |
| 2,137,133 | Dallmann | Nov. 15, 1938 |
| 2,411,330 | Melas et al. | Nov. 19, 1946 |
| 2,414,086 | Brewer | Jan. 14, 1947 |
| 2,518,797 | Landon | Aug. 15, 1950 |